(12) United States Patent
Poutievski et al.

(10) Patent No.: US 9,319,264 B1
(45) Date of Patent: Apr. 19, 2016

(54) NETWORKING SYSTEMS WITH DYNAMICALLY CHANGING TOPOLOGIES

(75) Inventors: Leon Poutievski, Santa Clara, CA (US); Amin Vahdat, Los Altos, CA (US); Ashish Naik, Los Altos, CA (US)

(73) Assignee: Google Inc., Mountain View, CA (US)

( * ) Notice: Subject to any disclaimer, the term of this patent is extended or adjusted under 35 U.S.C. 154(b) by 423 days.

(21) Appl. No.: 13/547,949

(22) Filed: Jul. 12, 2012

(51) Int. Cl.
*H04L 12/28* (2006.01)
*H04L 29/08* (2006.01)
*H04L 12/24* (2006.01)

(52) U.S. Cl.
CPC ......... *H04L 29/08315* (2013.01); *H04L 41/082* (2013.01)

(58) Field of Classification Search
CPC ............... H04L 29/08315; H04L 29/0836; H04L 41/082
See application file for complete search history.

(56) References Cited

U.S. PATENT DOCUMENTS

| | | | |
|---|---|---|---|
| 5,004,318 A * | 4/1991 | Ohashi | 385/19 |
| 6,954,437 B1 | 10/2005 | Sylvest et al. | |
| 6,970,617 B2 | 11/2005 | Mao et al. | |
| 8,121,563 B1 * | 2/2012 | Elliott | 455/130 |
| 8,867,915 B1 * | 10/2014 | Vahdat et al. | 398/55 |
| 9,065,582 B2 | 6/2015 | Barry et al. | |
| 9,065,773 B2 | 6/2015 | Aybay | |
| 2002/0042274 A1 | 4/2002 | Ades | |
| 2006/0047800 A1 * | 3/2006 | Caveney et al. | 709/223 |
| 2008/0049627 A1 * | 2/2008 | Nordin | 370/241 |
| 2009/0285091 A1 * | 11/2009 | Hiscock | 370/230 |
| 2011/0134931 A1 | 6/2011 | Merwe et al. | |
| 2011/0310894 A1 * | 12/2011 | Karino | 370/389 |
| 2012/0185229 A1 | 7/2012 | Perrett | |
| 2013/0325947 A1 | 12/2013 | Rigdon et al. | |

OTHER PUBLICATIONS

Farrington, et al. Helios: A Hybrid Electrical/Optical Switch Architecture for Modular Data Centers, SIGCOMM '10, Aug. 30-Sep. 3, 2010.
Farrington, et al., "A Multiport Microsecond Optical Circuit Switch for Data Center Networking", IEEE Photonics Technology Letters, vol. 25, No. 16, Aug. 15, 2013, pp. 1589-1592.
Farrington, et al., "Hardware Requirements for Optical Circuit Switched Data Center Networks", 2011.
Glick, et al., "Dynamically Reconfigurable Optical Links for High-Bandwidth Data Center Networks", copyright 2009.
Porter, et al., "Integrating Microsecond Circuit Switching into the Data Center", SIGCOMM '13, Aug. 12-16, 2013, pp. 447-458.
Schlansker, et al., "Configurable Optical Interconnects for Scalable Datacenters", Optical Society of America, copyright 2013.
US Office Action on U.S. Appl. No. 14/143,241 DTD Nov. 2, 2015.
US Office Action on U.S. Appl. No. 14/143,241 DTD Jul. 21, 2015.

\* cited by examiner

*Primary Examiner* — Ajay Cattungal
(74) *Attorney, Agent, or Firm* — Foley & Lardner LLP; Edward A. Gordon

(57) ABSTRACT

Network performance may be improved by adjusting a logical network topology while avoiding attendant disruptions. By identifying an alternative logical topology, routing network traffic away from links that will be eliminated from the alternative logical topology, and updating a traffic routing plan upon the adoption of the alternative logical topology, a network may adopt a more efficient topology without misdirecting network traffic.

34 Claims, 9 Drawing Sheets

NETWORKING SYSTEMS WITH DYNAMICALLY CHANGING TOPOLOGIES

FIELD OF THE INVENTION

The systems and methods described herein relate to changing topology of a computer network, and particularly, to changing a data-center network topology to improve network performance.

BACKGROUND

Many modern communications require computer networks. It is infeasible to directly connect every computer to every other computer with which it might exchange emails, videos, financial transactions, or other information. Computers are instead connected to each other via switches, devices which receive data from a computer, determine an intended destination of the received data, and transmit the received data towards the destination. Computers and switches are collectively referred to as network elements, and are connected by links, and the pattern of the links between the network elements is called the network topology.

Switches are generally programmed to route a packet through the fastest available path through the network topology and to a network destination. The routing performed by each switch in a network collectively forms a traffic routing plan, the path network traffic takes between any two points in the network. Switches can detect certain network events, including a link failing, and adjust the traffic routing plan in response, including by routing traffic around the broken link. Switches cannot, however, change the network topology. If there is heavy traffic between a pair of computers that are separated by a minimum of twenty links, at least twenty links will be occupied with the heavy traffic. The network is similarly inflexible in responding to a network element going offline or coming online. Changing network topology as well as the routing plan is therefore advantageous in computer network operations.

The disadvantages of changing network topology generally outweigh the benefits in modern data-center networks. A network link generally consists of a physical cable connecting two network elements, so changing a connectivity of data-center network elements is prohibitively time-consuming.

Some data-center networks partially address the difficulty of changing network topology with a configurable patch panel, a collection of ports that may be internally connected or disconnected on command. Configurable patch panels are referred to herein as smart patch panels. In such data-center networks, network elements are connected to the smart patch panel, which can connect different network elements to each other as needed. Such data-center networks thereby have two separate network topologies: a physical topology consisting of the pattern of cables connecting network elements and smart patch panels, and a logical topology consisting of the links between network elements created by the smart patch panels. But although smart patch panels can change logical topologies quickly, the temporary degradation in network performance caused by a logical topology change still outweighs the benefit to network performance.

When the links between network elements are broken and new links are created, each network element must rediscover the logical topology and determine a routing plan appropriate for the new topology. During the adjustment period, network elements fail to recognize the fastest network traffic routes, and may mistakenly transmit data packets down links that no longer lead to the destinations of the packets.

A system to prepare for and capitalize on a network topology change would therefore be of great benefit in data-center operations.

SUMMARY

The period of delayed or lost network traffic following a network link change generally negates the benefit of changing a network to a more efficient topology. A system that identifies a traffic routing plan before a topology is adopted and updates the traffic routing plan upon the adoption of the new topology would allow computer networks to adopt efficient topologies with smaller harm to network traffic, to the benefit of data-center operations.

The systems and methods described herein relate to improving performance of a computer network by adjusting the logical network topology while avoiding attendant disruptions. By identifying an alternative logical topology, routing network traffic away from links that will be eliminated from the alternative logical topology, and updating a traffic routing plan upon the adoption of the alternative logical topology, a network may adopt a more efficient topology without misdirecting network traffic.

In one aspect, the method monitors a network having a configurable patch panel (referred to herein as a smart patch panel) and a software-configured packet switch. The network has a physical topology, which may be based on how ports, software-configured packet switches, smart patch panels, or other network elements are connected by cables. The physical topology of the network constrains a logical topology of the network, the links between network elements through which data may be transferred. The smart patch panel, which in certain embodiments may be an optical circuit switch, can change the logical topology by establishing or breaking links between any network elements connected to the smart patch panel through the physical topology of the network. The software-configured packet switch allows a network element manager, which in certain embodiments may be an OpenFlow controller, to monitor traffic in the network. In certain embodiments, the physical topology information may be determined by allowing the software-configured packet switch to transmit a discovery packet across at least a portion of the network and thereby informing the network element manager of how network elements are connected in the current logical topology. In certain embodiments, the physical topology information may be determined by allowing the configurable patch panel to implement a predetermined logical topology, allowing inferences to be made regarding the physical topology of the network.

In the method, a solver may respond to a network event by identifying an alternative logical topology based on current physical topology information and traffic information. In certain embodiments, the network event may include a network administrator request, a failure to meet a network performance target, a change in network traffic, a change in a connection status of a network element, a change in connection status of a link, or some other predetermined network event. In certain embodiments, the alternative logical topology may be based on a network performance target, such as a maximum of the average number of links a packet crosses before reaching a destination, minimal traffic and latency between each pair of network elements, or some other suitable performance target. The solver may determine whether to implement the alternative logical topology by determining whether a projected benefit of the alternative logical topology is greater than a projected cost by a predetermined amount. The projected benefit may include an increase in spare bandwidth or other appropriate criteria; the projected cost may include a decrease in bandwidth while the alternative logical topology is being implemented.

If the method will implement the alternative logical topology, the solver may identify a provisional logical topology to maintain network operations while implementing the alternative logical topology. The provisional logical topology may represent a topology intermediate between a current logical topology and the alternative logical topology. In certain embodiments, the provisional logical topology may be based on a network performance target, such as a maximum of the average number of links a packet crosses before reaching a destination, minimal traffic and latency between each pair of network elements, or some other suitable performance target. In certain embodiments, the provisional logical topology may be based on a duration of the provisional logical topology.

Before a patch panel manager reconfigures the smart patch panel to implement a logical topology, the solver may identify if any links will be broken by the change and generate a temporary traffic routing plan bypassing such links. A traffic routing plan, whether temporary or not, identifies the links through which a software-configured packet switch will transmit data, and may be provided to the software-configured packet switch by the network element manager. The patch panel manager may reconfigure the smart patch panel to implement the provisional logical topology, and the network element manager may provide a traffic routing plan based on the provisional logical topology to the software-configured packet switch. In certain embodiments, the method may implement a logical topology change without preemptively rerouting network traffic by providing the temporary traffic routing plan to the software-configured packet switch.

According to another aspect, the non-transitory computer readable medium stores a program for responding to a network event by reconfiguring a network topology of a network having a smart patch panel and a software-configured packet switch. In certain embodiments, the smart patch panel may be an optical circuit switch. In certain embodiments, the network event may include a network administrator request, a failure to meet a network performance target, a change in network traffic, a change in a connection status of a network element, a change in connection status of a link, or some other predetermined network event. The program identifies an alternative logical topology based on current physical topology information and traffic information, and in certain embodiments based on a network performance target as well. In certain embodiments, the physical topology information may be determined by allowing the software-configured packet switch to transmit a discovery packet across at least a portion of the network. In certain embodiments, the physical topology information may be determined by allowing the configurable patch panel to implement a predetermined logical topology.

The program may identify a provisional logical topology representing a topology intermediate between a current logical topology and the alternative logical topology. In certain embodiments, the provisional logical topology may be identified based on a network performance target, on a duration of the provisional logical topology, or on some other predetermined criteria. The program may identify a link in the current logical topology that will be eliminated from the provisional logical topology and generate a temporary traffic routing plan bypassing the link which will be eliminated. In certain embodiments, the program may provide the temporary traffic routing plan to the software-configured switch. The program may reconfigure the configurable patch panel to implement the provisional logical topology, and may provide a traffic routing plan based on the provisional logical topology to the software-configured packet switch. In certain embodiments, the program may be implemented by an OpenFlow controller.

According to another aspect, the system described herein relates to carrying out at least the method described above. In certain embodiments, the system comprises a patch panel manager, a network element manager, a wiring verification component, a solver, and a sequencer. The patch panel manager programs the smart patch panel, which in certain embodiments may be an optical circuit switch, to implement a logical topology for the computer network. The network element manager monitors a status of and programs a traffic routing plan into the software-configured packet switch, and in certain embodiments may be an OpenFlow controller. The wiring verification component determines the connectivity of the smart patch panel to other elements in the computer network, in certain embodiments by coordinating actions of the patch panel manager and the network element manager. The solver responds to a network event by identifying an alternative logical topology based on the determined connectivity of the smart patch panel, the status of the software-configured packet switch, and a network performance target. The network event may include a network administrator request, a failure to meet a network performance target, a change in network traffic, a change in a connection status of a network element, a change in a connection status of the smart patch panel, or some other predetermined network event. The solver generates one or more alterations to the logical topology and the traffic routing plan for implementing the alternative logical topology. The alterations to the traffic routing plan may include routing traffic among the network elements to preempt disruption by a logical topology alteration, instructing the smart patch panel to implement the logical topology alteration, and rerouting network traffic to take advantage of the newly adopted logical topology. The sequencer coordinates the network element manager and the patch panel manager to implement the alternative logical topology by coordinating the alterations generated by the solver.

BRIEF DESCRIPTION OF THE DRAWINGS

The systems and methods described herein are set forth in the appended claims. However, for the purpose of explanation, several embodiments are set forth in the following figures.

DETAILED DESCRIPTION OF CERTAIN ILLUSTRATIVE EMBODIMENTS

In the following description, numerous details are set forth for the purpose of explanation. However, one of ordinary skill in the art will realize that the embodiments described herein may be practiced without the use of these specific details and that the embodiments described herein may be modified, supplemented, or otherwise altered without departing from the scope of the invention.

The systems and methods described herein improve network performance by using centralized control to respond to a network event by altering both the logical topology and traffic routing plan of the network while avoiding network disruptions. By routing network traffic away from links that will be broken by a logical topology adjustment and updating the traffic routing plan upon the completion of a logical topology change, a network may adopt a more efficient logical topology without misdirecting network traffic.

Figure 1:
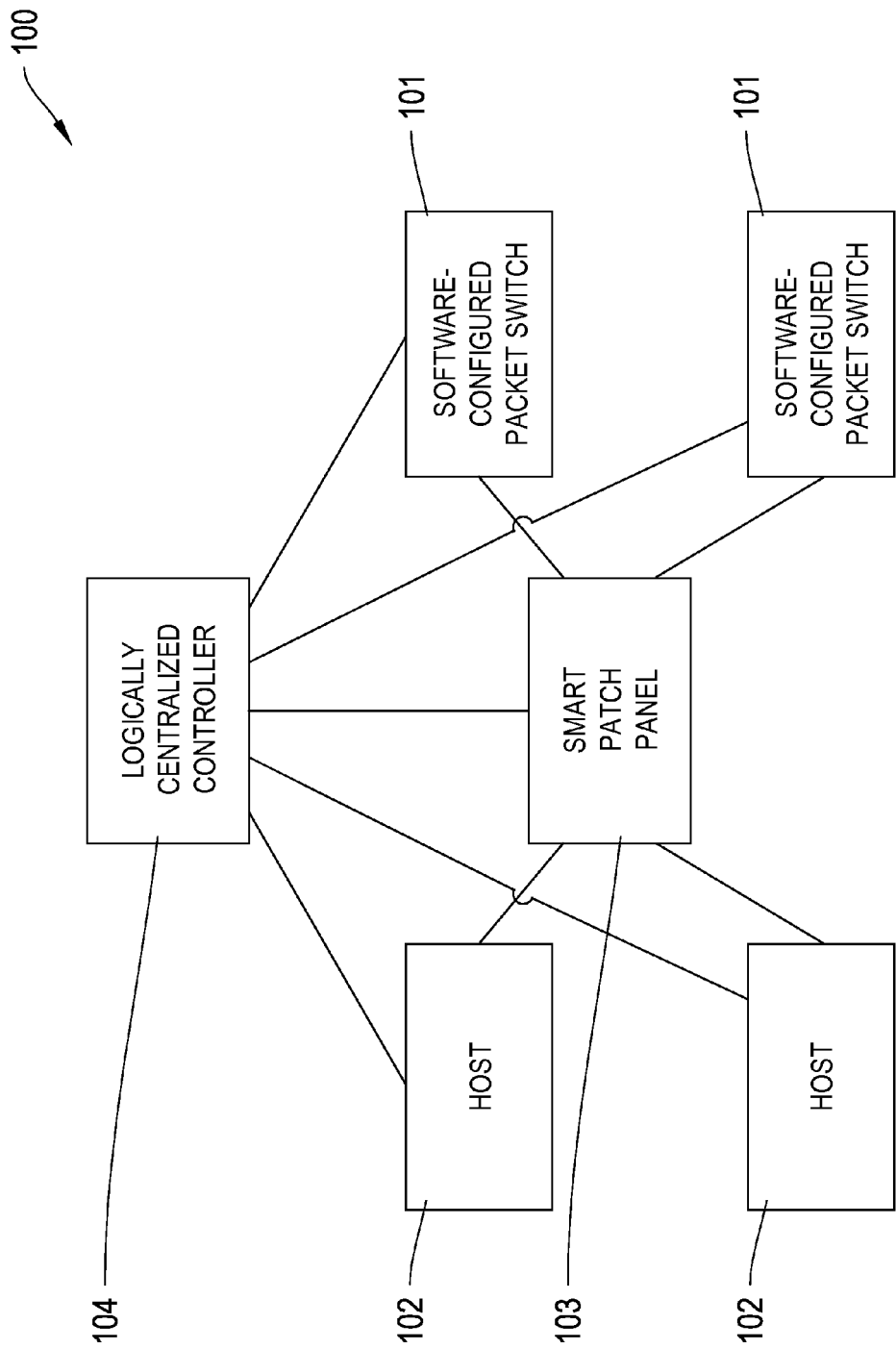
FIG. 1 is a diagram of a centrally controlled, flexible-topology network, according to an illustrative embodiment.

FIG. 1 is an illustrative diagram of a network 100 with a flexible topology. In network 100, a software-configured packet switch 101 transmits network traffic associated with a host 102, which may be a server directly connected to a switch in network 100, a computer network linked to network 100, or some other suitable source of or destination for network traffic. Software-configured packet switches 101 and hosts 102, collectively referred to as network elements, are connected through a smart patch panel 103, which can change the logical topology of network 100 by changing how and whether associated network elements are connected to each other. Logically centralized controller 104 monitors the status of and traffic in network 100, controls how smart patch panel 103 connects associated network elements, and controls how software-configured packet switch 101 routes traffic. Logically centralized controller 104 can therefore change both the logical topology and traffic routing plan of network 100, allowing network 100 to adapt to circumstances and reducing the disruptions associated with those adaptations. That adaptability may be implemented in a network with more software-configured packet switches 101, hosts 102, or smart patch panels 103 than are shown. In certain embodiments, network 100 may be connected to other networks, the elements of which are distinguished from network 100 by not being under the control of logically centralized controller 104. In certain embodiments, hosts 102 may not be directly connected to logically centralized controller 104.

The centralized overview and control provided by logically centralized controller 104 improves the performance of network 100. In response to a predetermined network event, such as a network administrator request, a change in a connection status of a part of or a whole network element, a failure to meet a network performance target, a change in network traffic, or other suitable network event, logically centralized controller 104 revises the traffic routing plan implemented by software-configured packet switches 101 and determines whether an alternative logical topology would improve the performance of network 100. As an illustrative example, logically centralized controller 104 may reduce the number of links that network traffic between two servers must cross in response to a large increase in the traffic between the two servers. If an alternative logical topology would improve the performance of network 100, logically centralized controller 104 further identifies how to maintain network operation during the logical topology change. Network operation may be maintained during the logical topology change by implementing a provisional logical topology before implementing the alternative logical topology. Logically centralized controller 104 implements each logical topology change by temporarily rerouting network traffic away from links that will be changed during the coming logical topology, implementing the logical topology stage in smart patch panel 103, and finally changing the traffic routing plan to take advantage of the new logical topology.

Figure 2A:
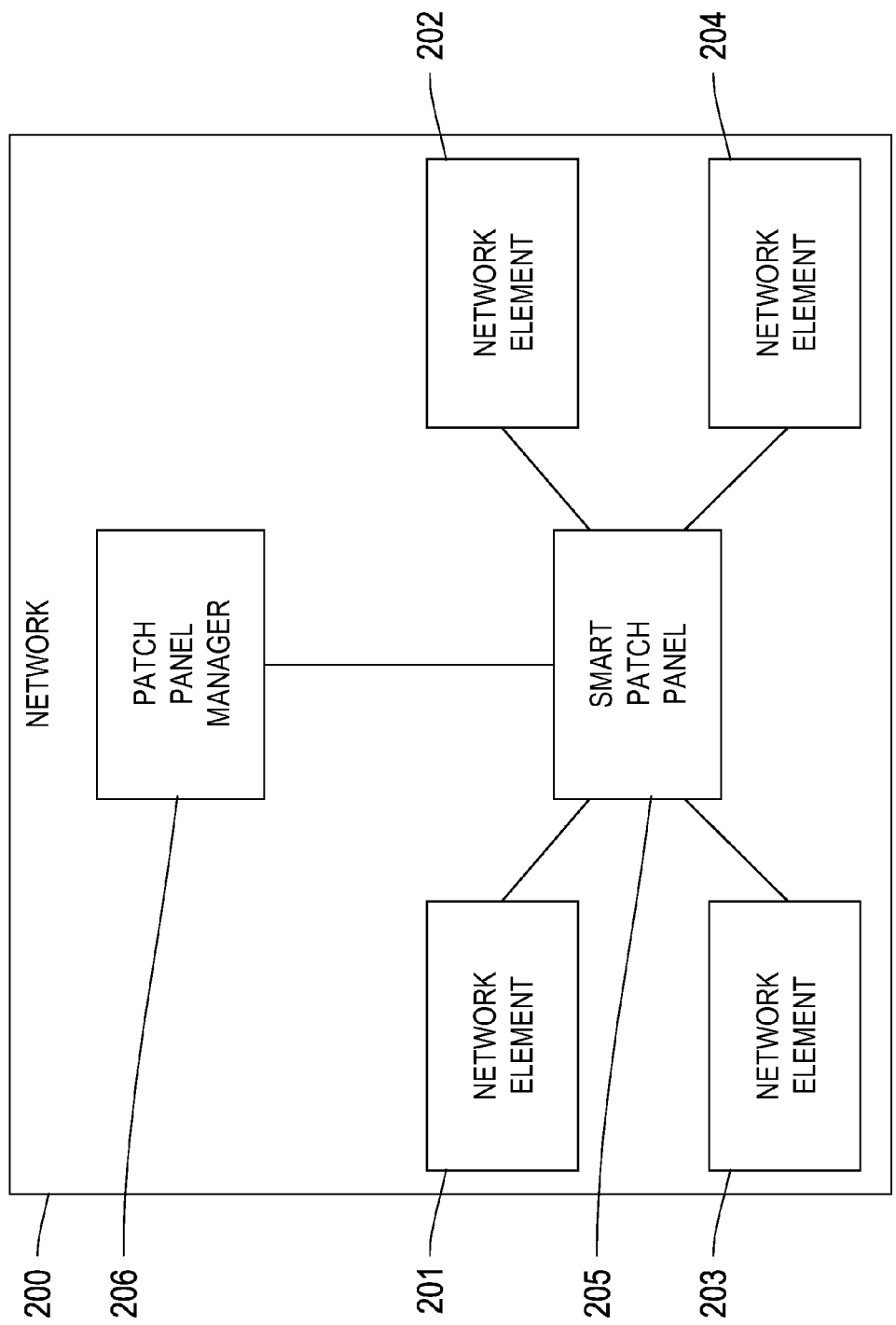
FIG. 2A is a diagram of the physical topology of a network using a smart patch panel, according to an illustrative embodiment.
Figure 2B:
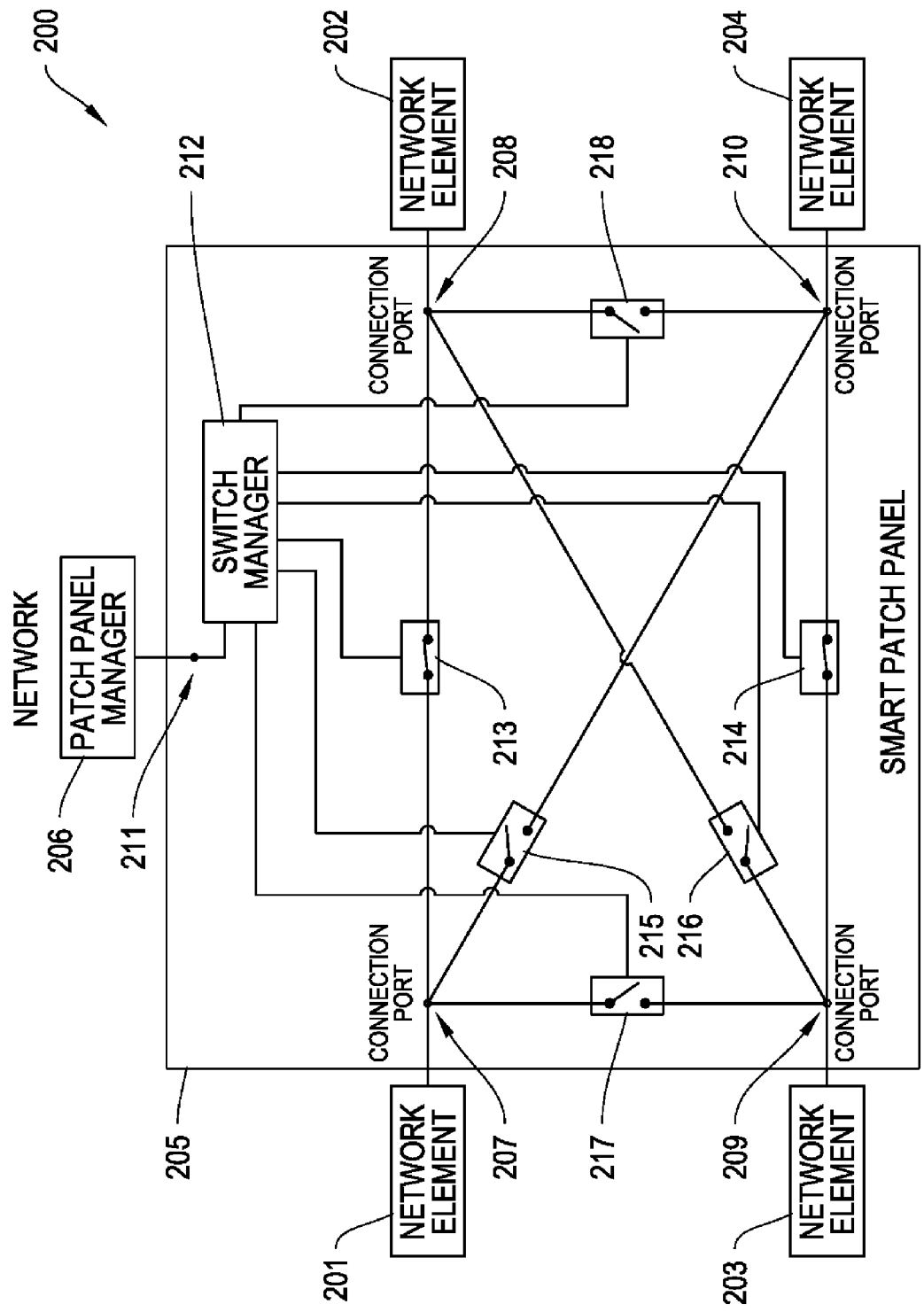
FIG. 2B is a diagram of a possible logical topology of a network using a smart patch panel, according to an illustrative embodiment.

FIGS. 2A and 2B are illustrative diagrams of a network 200. FIG. 2A depicts the physical topology of network 200: network elements 201-204 are physically linked to a smart patch panel 205, which is controlled by a patch panel manager 206. FIG. 2B depicts a logical topology of network 200 created by smart patch panel 205. Network elements 201 and 202 are connected to each other via connection ports 207 and 208 of smart patch panel 205, and network elements 203 and 204 are connected to each other via connection ports 209 and 210 of smart patch panel 205. While no cables directly link the network elements, smart patch panel 205 creates virtual links that allow network elements to communicate with each other.

Smart patch panel 205 connects or disconnects connection ports 207-210 according to instructions received from patch panel manager 206 via instruction port 211. Such instructions are implemented by switch controller 212, which breaks or makes connections between connection ports 207-210 by opening or closing switches 213-218. In certain embodiments, smart patch panel 205 is an optical circuit switch. In certain embodiments, one network element may be connected to more than one connection port 207-210, for example by connecting connection ports 207 and 208 to two different ports on a single software-configured packet switch.

The depicted connection ports 207-210 are communication ports capable of transmitting network traffic, which may include traffic transmitted using the 100BASE-TX Ethernet protocol, the 1000BASE-T Ethernet protocol, the 10 GBASE-T Ethernet protocol, or other suitable network traffic protocol. Each of the connection ports 207-210 transmits data received from a network element to a second port connected by smart patch panel 205, and transmits data received from the second port to a network element. As an illustrative example, if smart patch panel 205 connects connection port 207 to connection port 208, data received from network element 201 will be transmitted to network element 202 via connection port 208. In certain embodiments, ports 207-210 may translate electrical signals to optical signals and vice-versa. In certain embodiments, there may be a different number of connection ports than are depicted.

The depicted instruction port 211 is a network port similar to connection port 207. Smart patch panel 205 receives connection instructions from and transmits connection information to patch panel manager 206 through instruction port 211. In certain embodiments, instruction port 211 may be a logical port dedicated to communications with patch panel manager 206, such as a socket end point of a transmission control protocol (TCP), secure sockets layer (SSL), transport layer security (TLS), or other connection protocol suitable for transmitting control communications. In certain embodiments, there may be more than one instruction port 211.

The depicted switch controller 212 is a controller which, in response to instructions received through instruction port 211, opens or closes switches 213-218 of smart patch panel 205, disconnecting or connecting ports respectively.

Switches 213-218 are computer-controlled switches which determine the connections between connection ports 207-210. As depicted, switch 213 is closed, and therefore connection port 207 is connected to connection port 208; similarly, as switch 214 is closed, connection port 209 is connected to connection port 210. Likewise, connection ports 207 and 210 could be connected by closing switch 215; connection ports 208 and 209 could be connected by closing switch 216; connection ports 207 and 209 could be connected by closing switch 217; and connection ports 208 and 210 could be connected by closing switch 218. In certain embodiments, switches 213-218 may be software switches, transistors, Pockels cells, microelectromechanical systems directing an optical signal toward a path, or other suitable switches.

Smart patch panel 205 can change the logical topology of network 200. As depicted in FIG. 2B, switches 213 and 214 are closed while switches 215-218 are open, in which case a data packet transmitted by network element 201 will be received by network element 202. If, however, patch panel manager 206 instructs switch controller 212 to close switch 213 and open switch 215, a data packet sent by network element 201 will instead reach network element 204. Likewise, if patch panel manager 206 instructs switch controller to open switch 217 and close all other switches, a data packet sent by network element 201 will be received by network element 203. Smart patch panel 205 therefore allows network 200 to adopt several different logical topologies without changing the physical topology depicted in FIG. 2A.

Figure 3:
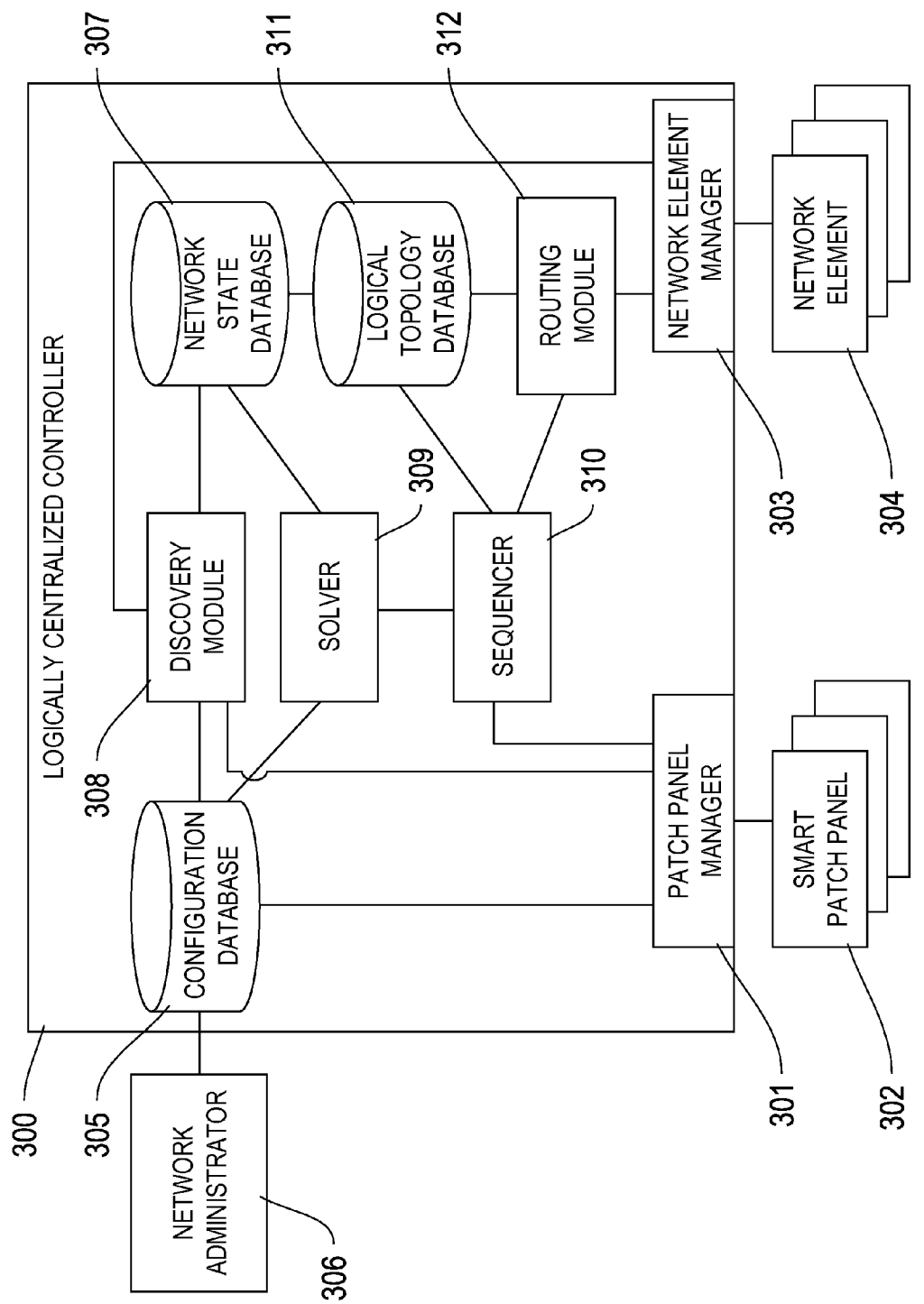
FIG. 3 is a diagram of a central network controller, according to an illustrative embodiment.

FIG. 3 is an illustrative diagram of a logically centralized controller 300, a computing device which improves performance of a network by identifying and implementing an alternative logical topology for the network. Logically centralized controller 300 includes a patch panel manager 301, a network element manager 303, a configuration database 305, a network state database 307, a discovery module 308, a solver 309, a sequencer 310, a logical topology database 311, and a routing module 312. Discovery module 308 identifies which logical topologies the network may adopt by using patch panel manager 301 and network element manager 303 to coordinate the activities of smart patch panel 302 and network elements 304, which include a software-configured packet switch. Based on network conditions identified by network element manager 303 and performance targets provided by network administrator 306, solver 309 identifies one of the identified logical topologies as an alternative logical topology. Sequencer 310 schedules the activities of routing module 312 and patch panel manager 301 to implement the alternative logical topology while meeting network performance targets established by network administrator 306. Before a logical topology change, sequencer 310 instructs routing module 312 to generate and, via network element manager 303, implement a temporary traffic routing plan that will not be affected by the logical topology change. Once routing module 312 has implemented the temporary traffic routing plan, sequencer 310 instructs patch panel manager 301 to implement the logical topology change by changing internal connections within smart patch panel 302. After the logical topology change has been implemented, logical topology database 311 is updated, and routing module 312 updates the traffic routing plan to reflect the new logical topology. In certain embodiments, logically centralized controller 300 may be an OpenFlow Controller. In certain embodiments, the elements of logically centralized controller 300 may be located on separate physical computing devices, such as servers, general purpose processors, mainframes, or clusters of computing devices, and coupled via a network.

The depicted patch panel manager 301 is a processor programmed to monitor how the ports of smart patch panel 302 are internally connected, record internal connection information of smart patch panel 302 in configuration database 305, and direct internal connection changes in smart patch panel 302. In certain embodiments, patch panel manager 301 may use the TL1 protocol, the OpenFlow protocol, or some other appropriate protocol. In certain embodiments, smart patch panel 302 is an optical circuit switch.

The depicted network element manager 303 is a processor programmed to monitor network elements 304. Network element manager 303 records traffic and status information in network state database 307. Network element manager 303 also implements a traffic routing plan in network elements 304. In certain embodiments, network element manager 303 may use the OpenFlow protocol or some other appropriate protocol.

The depicted configuration database 305 is a computer-readable medium storing network performance targets provided by network administrator 306 and physical topology information of smart patch panel 302 and network elements 304. Network performance targets may include a maximum time taken for a data packet to traverse the network, explicit instructions to avoid or maximize use of a designated network element, and other suitable targets. Physical topology information of smart patch panel 302 and network elements 304 may be provided by network administrator 306 or discovery module 308, and includes which ports of smart patch panel 302 are connected to which ports of network elements 304. In certain embodiments, configuration database 305 may include random access memory (RAM), a hard drive, flash memory, or other suitable computer-readable medium.

The depicted network state database 307 is a computer-readable medium storing traffic and status information of network elements 304. Traffic information of a network element 304 may include the amount of network traffic being sent and received through a link to a second network element 304 and other traffic information. Status information of a network element 304 may include whether a port of the network element 304 is available and other status information. In certain embodiments, configuration database 305 may be random access memory (RAM), a hard drive, flash memory, or other suitable computer-readable medium.

The depicted discovery module 308 is a computer processor programmed to determine the physical topology of smart patch panel 302 and network elements 304, including when smart patch panel 302 or a network element 304 is first connected to logically centralized controller 300, when the reason for a logical topology link failure is unclear, and in other suitable situations. Discovery module 308 discovers logical connections by instructing network elements 304 to transmit a discovery packet, a packet sent over a link to identify the network elements connected by the link. Network element manager 303 tracks the sources and recipients of discovery packets and reports the information to discovery module 308. By generating a predetermined pattern of discovery packets over predetermined smart patch panel configurations, discovery module 308 deduces which logical topologies the network may adopt and how. Discovery module 308 updates configuration database 305 accordingly.

The depicted solver 309 is a computer processor programmed to identify an alternative logical topology for the network and determine if the alternative logical topology should be adopted by the network. Solver 309 identifies an alternative logical topology that meets network performance targets set by network administrator 306 under the network status as stored in network state database 307, subject to the constraint of the physical topology as stored in configuration database 305. Solver 309 may identify the alternative logical topology through a linear programming model, a heuristic algorithm, or another suitable method. If the alternative logical topology would improve performance by a predetermined amount, logically centralized controller 300 will implement the alternative logical topology. In certain embodiments, the predetermined amount may be a function of the network status.

The depicted sequencer 310 is a computer processor programmed to implement the alternative logical topology identified by solver 309 while meeting network performance targets established by network administrator 306. To implement the alternative logical topology while meeting network performance targets, sequencer 310 may identify and implement a sequence of provisional logical topologies. A provisional logical topology is a logical topology in which each link corresponds to a link in either the current or the alternative logical topology, and in which a traffic routing plan may include all sources and destinations of network traffic in the network. The sequence of provisional topologies is ordered by the percentage of links in the provisional topology which correspond to links in the alternative logical topology. The number of topologies in the sequence is subject to a maximum provided by network administrator 306, which may be provided as a function of the network status, as a function of the duration of the sequence, as a function of the network performance during each step of the sequence, or as some other appropriate limit. For each logical topology change, sequencer 310 identifies whether links in a current logical topology will be eliminated from the next logical topology, instructs routing module 312 to update the traffic routing plan to bypass the links that will be eliminated, instructs smart patch panel 301 to implement the logical topology change, updates logical topology database 311, and instructs routing module 312 to update the traffic routing plan according to logical topology database 311. In certain embodiments, sequencer 310 may be combined with solver 309.

The depicted logical topology database 311 is a computer-readable medium storing the logical topology of the network elements 304, and may include random access memory (RAM), a hard drive, flash memory, or other suitable computer-readable medium. The logical topology database 311 is updated according to the state information recorded in network state database 307 and the logical topology information provided by sequencer 310. In certain embodiments, logical topology database 311 may be combined with network state database 307.

The depicted routing manager 312 is a computer processor programmed to determine how to route network traffic among network elements 304 through the Dijkstra shortest path algorithm or another suitable routing algorithm, and to provide a traffic routing plan to network elements 304 through network element manager 303. Under normal network operation, routing manager 312 uses traffic information stored in network state database 307 and logical topology information stored in logical topology database 311. When the logical topology of the network will be changed, sequencer 310 provides further logical topology information to allow routing manager 312 to prevent network traffic from being misdirected when the logical topology change will be implemented. In certain embodiments, routing manager 312 may be combined with solver 309 or sequencer 310.

Logically centralized controller 300 improves network performance by adjusting the logical topology of the network. To identify when a logical topology change is necessary, patch panel manager 301 monitors smart patch panel 302 and network element manager 303 monitors network elements 304. In response to a network event, including a change in a connectivity of a smart patch panel 302 or a network element 304, a request from system administrator 306, a failure to meet a network performance target, a change in network traffic, or other suitable network event, solver 309 will identify an alternative logical topology and determine whether the alternative logical topology would improve network performance. If the alternative logical topology should be adopted, sequencer 310 determines how to implement the alternative logical topology while meeting network performance targets, which may include identifying provisional logical topologies that may be implemented to maintain network performance during the adoption of the alternative logical topology. For each logical topology change, sequencer 310 coordinates routing manager 312 and patch panel manager 301 to preemptively change the traffic routing plan to avoid links that will be eliminated from the next logical topology, implement the topology change, and update the traffic routing plan in light of the topology change.

Figure 4:
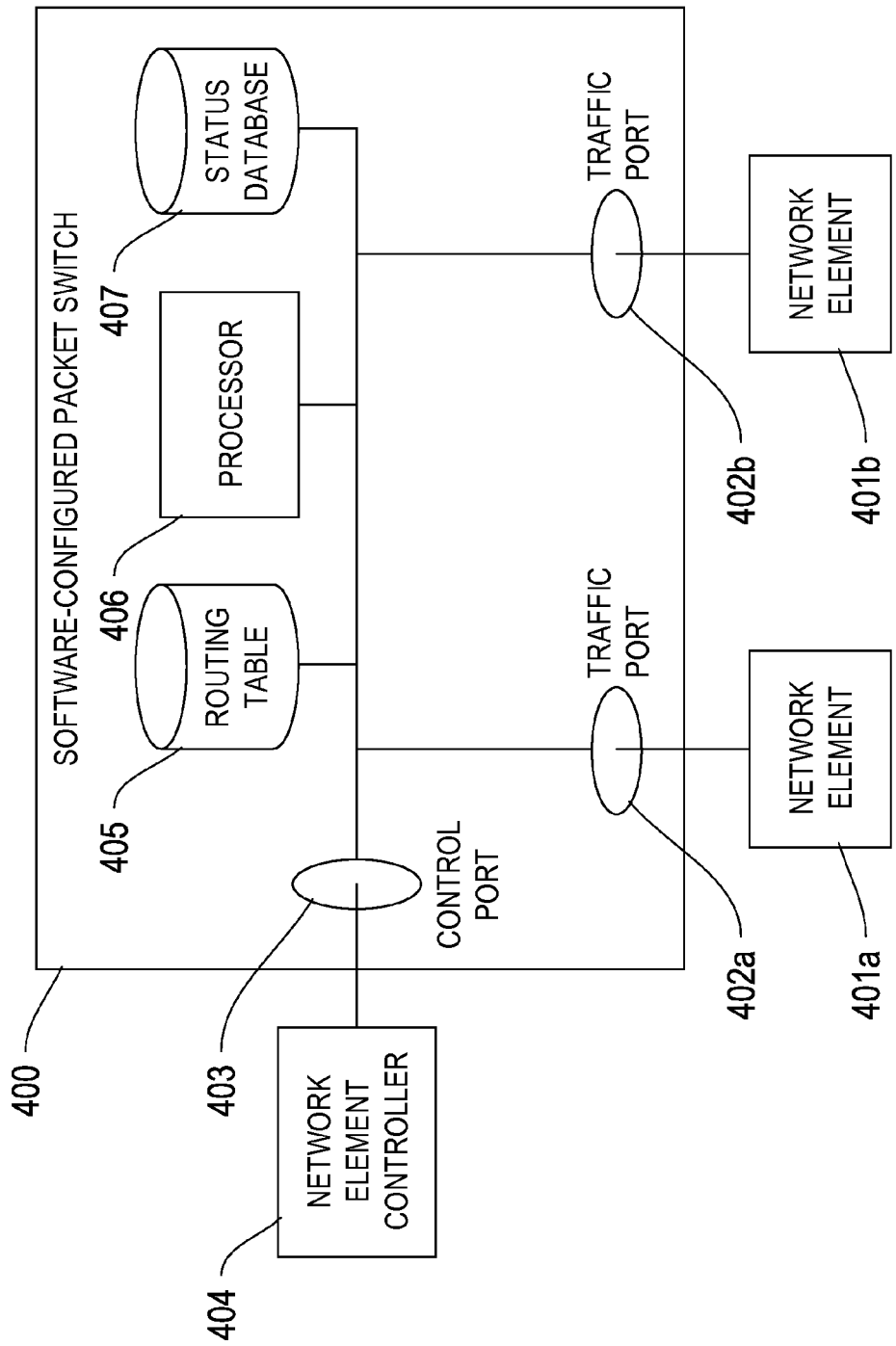
FIG. 4 is a diagram of a software-configured packet switch, according to an illustrative embodiment.

FIG. 4 is an illustrative diagram of a software-configured packet switch 400, which transmits network traffic between connected network elements. Software-configured packet switch 400 includes traffic ports 402a and 402b, control port 403, routing table 405, processor 406, and status database 407. Network elements 401a and 401b are connected to traffic ports 402a and 402b respectively, and a network element controller 404 is connected to control port 403. Software-configured packet switch 400 sends and receives network traffic through traffic ports 402a and 402b. Processor 406 determines the destination of incoming network traffic, forwards the traffic according to the rules stored in routing table 405, and stores status information in status database 407. As an illustrative example, if network element 401a sends data to network element 401b, software-configured packet switch 400 will receive the data at traffic port 402a, identify the destination of the data at processor 406, and transmit the data to network element 401b via traffic port 402b in accordance with instructions in routing table 405. Status information may include whether ports 402a and 402b are available, the amount and destination of traffic sent and received, capacity utilization, or other information regarding the operations of software-configured packet switch 400. Control port 403 allows software-configured packet switch 400 to communicate the information in status database 407 to network element controller 404, and allows network element controller 404 to update routing table 405. In certain embodiments, software-configured packet switch 400 may operate under the OpenFlow protocol.

The depicted traffic ports 402a and 402b are network ports which receive network traffic from linked network elements and transmit network traffic sent by processor 406. Traffic ports 402a and 402b may include 100BASE-TX ports, 1000BASE-T ports, 10 GBASE-T ports, or other suitable network ports. In certain embodiments, there may be a different number of ports than are depicted.

The depicted control port 403 is a network port connecting software-configured packet switch 400 with network element controller 404, and may include a 100BASE-TX port, a 1000BASE-T port, a 10 GBASE-T port, or other suitable network port. In certain embodiments, control port 403 may be a logical port dedicated to communications with network element controller 404, such as a socket end point of a transmission control protocol (TCP), secure sockets layer (SSL), transport layer security (TLS), or other connection protocol suitable for allowing communications between software-configured packet switch 400 and network element controller 404. Software-configured packet switch 400 transmits status information, such as network traffic information, port status, or other relevant status information, to network element controller 404 via control port 403; network element controller 404 transmits routing instructions to software-configured packet switch 400 via control port 403. In certain embodiments, there may be more than one control port 403.

The depicted routing table 405 is a computer-readable medium suitable for storing routing rules in software-configured packet switch 400, including RAM, a hard drive, flash memory, or other suitable computer-readable medium. A routing rule indicates where and how to transmit incoming network traffic based on the destination of the traffic, the source of the traffic, or some other suitable information. The routing rules in routing table 405 reflect a traffic routing plan.

The depicted processor 406 is a computer processor capable of receiving, analyzing, and transmitting data through network ports. Processor 406 receives network traffic through traffic ports 402a and 402b, identifies where and how to transmit the network traffic, and transmits the network traffic accordingly. Processor 406 can revise routing table 405 in response to receiving modification instructions from network element controller 404. Processor 406 also gathers status information regarding software-configured packet switch 400 and stores the data in status database 407. Processor 406 may transmit the data stored in status database 407 to network element controller 404 in response to a change in status information, the passage of a predetermined amount of time, the receipt of a request by network element controller 404, or other suitable reason. In some embodiments, processor 406 may also revise routing table 405 in response to the failure of a traffic port.

The depicted status database 407 is a computer-readable medium used to store status information about software-configured packet switch 400, such as whether a port is active, the rate of traffic passing through a port, or other status information. Status database 407 may be RAM, a hard drive, flash memory, or other suitable computer-readable medium.

Software-configured packet switch 400 transmits network traffic between network elements linked to software-configured packet switch 400 in the logical topology. Rules for routing network traffic are provided by network element controller 404 via control port 403, and are stored in routing table 405. When network traffic with a predetermined characteristic is received over traffic port 402a or 402b, processor 406 identifies the predetermined characteristic and follows an appropriate rule for routing the network traffic. Processor 406 also records status information regarding software-configured packet switch 400 in status database 407 and sends status information to network element controller 404. Network element controller 404 may modify routing rules in response to receiving status information; processor 406 may independently modify routing rules in response to a change in the status of software-configured packet switch 400.

Figure 5:
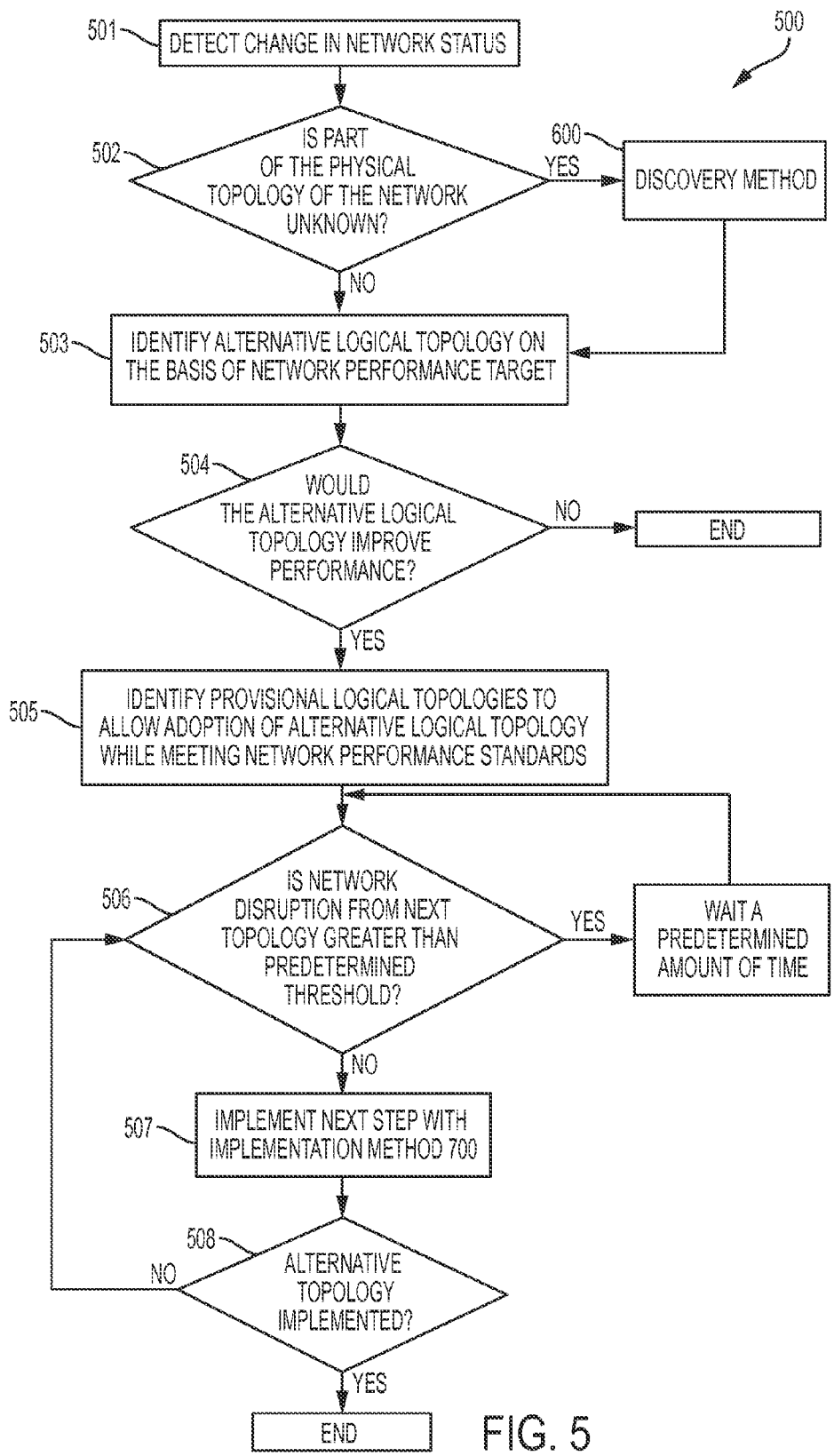
FIG. 5 is a flow chart of a method of changing a network topology, according to an illustrative embodiment.

FIG. 5 is a flow chart depicting an illustrative embodiment of a method 500 of changing the logical topology of a network, referred to herein as dynamic change method 500. As changing a logical topology uses network resources, dynamic change method 500 is made in response to a predetermined change in network status, which may include a change in network traffic, a change in a connection status of a network element or configurable patch panel, a network administrator request, a failure to meet a network performance target, an expected failure to meet a network performance target, a lapse of a predetermined amount of time, or some other predetermined network status change. Once step 501 detects the predetermined change in network status, dynamic change method 500 identifies an alternative network topology, determines whether and how to implement the alternative topology, and finally implements the change.

To identify an alternative network topology, dynamic change method 500 must be able to identify which network topologies are possible. Step 502 therefore determines whether part of the physical topology of the network is unknown. If so, discovery method 600, detailed below, identifies how network elements are connected to the network, and thus identifies which logical topologies the network may adopt.

Once the possible logical topologies of the network are known, step 503 identifies an alternative logical topology. Step 503 may be carried out by providing an expected traffic pattern in the network and, given the expected network traffic pattern, identifying a possible logical topology that maximizes the expected median data transfer rate, minimizes the expected median bandwidth utilization, or meets some other suitable criteria.

Step 504 determines whether the network will adopt the alternative network topology by determining the expected network performance under the alternative logical topology given the expected network traffic pattern. Network performance under a logical topology may be defined by the median data transfer rate, the median bandwidth utilization, compliance with network administrator directives, or by some other suitable basis. Dynamic change method 500 will implement the alternative logical topology only if the alternative logical topology is expected to outperform the current logical topology by a predetermined amount. In some embodiments, the predetermined amount may be a function of ongoing network traffic.

As network traffic may be disrupted by the adoption of the alternative logical topology, dynamic change method 500 may implement a provisional logical topology to reduce network traffic disruption. Step 505 identifies a provisional logical topology on the basis of minimizing expected network disruption. The provisional logical topology may be identical to the alternative logical topology, and the expected network disruption may be a time required to implement a change, a decrease in data transfer rates associated with implementing a change, or some other suitable measurement of network disruption. In certain embodiments, step 505 may identify more than one provisional logical topology.

Step 506 determines whether the network disruption expected from the next logical topology to be implemented is greater than some predetermined threshold, which may be a function of the ongoing network traffic. If step 506 determines that the network disruption created by implementing the next logical topology is too high, implementation may be delayed by a predetermined amount of time; otherwise step 507 implements the next logical topology using implementation method 700, detailed below. Step 508 determines if the alternative logical topology has been implemented. If not, dynamic change method 500 is complete; otherwise dynamic change method 500 returns to step 506.

In certain embodiments, if a predetermined change in network status occurs after dynamic change method 500 has identified a first alternative logical topology, dynamic change method 500 may concurrently identify a second alternative logical topology. Dynamic change method 500 would then compare the two alternative logical topologies and implement that alternative logical topology which may be expected to provide better network performance.

Figure 6:
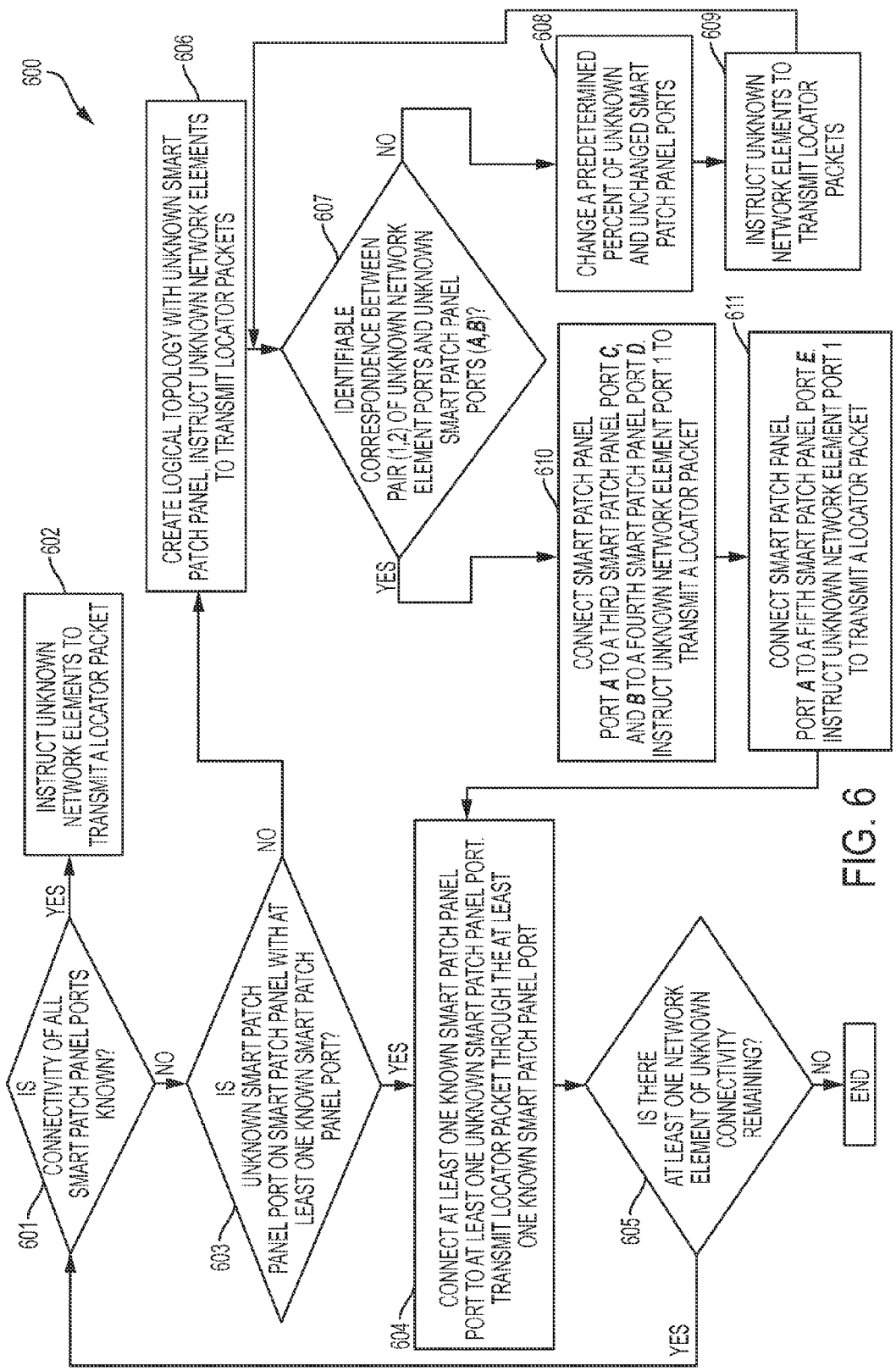
FIG. 6 is a flow chart of a method of discovering a physical network topology, according to an illustrative embodiment.

FIG. 6 is a flow chart depicting an illustrative embodiment of discovery method 600, a method of determining the physical topology of a network. Discovery method 600 determines the physical topology of a network element through the use of discovery packets, packets sent over a link to identify the network elements connected by the link. Software-configured packet switches inform a network element manager or system administrator of the sources and recipients of discovery packets, revealing the logical topology of the network. But as a smart patch panel can change connections between network elements, verification method 600 must further determine which network element port is connected to which smart patch panel port. Step 601 therefore identifies whether the connectivity of all smart patch panel ports is known. If so, step 602 instructs unknown network elements—network elements of unknown physical topology—to send a discovery packet and thereby reveal their connectivity.

If step 601 identifies a smart patch panel port of unknown connectivity, step 603 identifies whether the unknown smart patch panel port is on a smart patch panel with a smart patch panel port of known connectivity. If so, step 604 connects the known smart patch panel port with the unknown smart patch panel port and uses a discovery packet to reveal which network element, if any, is connected to the unknown smart patch panel port. Step 605 determines whether the connectivity of any network element remains unknown, and, if so, returns verification method 600 to step 601; otherwise, verification method 600 is complete.

If step 603 indicates that no ports of a smart patch panel have a known connectivity, step 606 instructs the smart patch panel to create a logical topology, and further instructs each network element of unknown connectivity to send a discovery packet from each port. A response to such a discovery packet indicates how two network elements are connected in the logical topology created in step 606, but no more.

Steps 607-609 change the logical topology created by the unknown smart patch panel to deduce a relationship between unknown network element ports and unknown smart patch panel ports. Step 607 determines whether a relationship between a pair of unknown network element ports and a pair of unknown smart patch panel ports may be identified. If not, step 608 changes the connections of a predetermined fraction of the unknown smart patch panel ports which still correspond to the logical topology created in step 606. Step 609 then has each unknown network element transmit a discovery packet from each port. Network elements connected to the unchanged, unknown smart patch panel ports will exhibit the same pairing that was observed in step 606. Step 609 then returns to step 607.

Once steps 607-609 identify the relationship between a pair of unknown smart patch panel ports and a pair of unknown network element ports, step 610 changes the connectivity of the pair of smart patch panel ports and instructs one of the two unknown network element ports to transmit a discovery packet. Step 611 further changes the connectivity of one of the original pair of the smart patch panel ports and instructs the same network element port in step 610 to transmit a second discovery packet. Comparing the results of steps 610 and 611 reveal the connectivity of the original pair of smart patch panel ports, and verification method 600 may proceed to step 604. As an illustrative example, suppose smart patch panel ports L and M are known to connect network element ports 11 and 15. If smart patch panel ports L and M are then connected to smart patch panel ports A and B, respectively, and a discovery packet sent from network element port 11 is received by network element port 8, it is still unclear whether network element port 11 is connected to smart patch panel port L or M. Connecting smart patch panel port L to a fifth smart patch panel port C while leaving smart patch panel port M connected to smart patch panel port B will resolve the ambiguity. If a discovery packet then sent from network element port 11 is received by network element port 8, network element port 11 is connected to smart patch panel port M; if the discovery packet was instead received by network element port 20, network element port 11 is connected to smart patch panel port L. Network element port 15 is connected to whichever smart patch panel port L or M that network element port 11 is not connected to.

In some embodiments, verification method 600 uses implementation method 700, described below, when changing the logical topology of a known network element.

Figure 7:
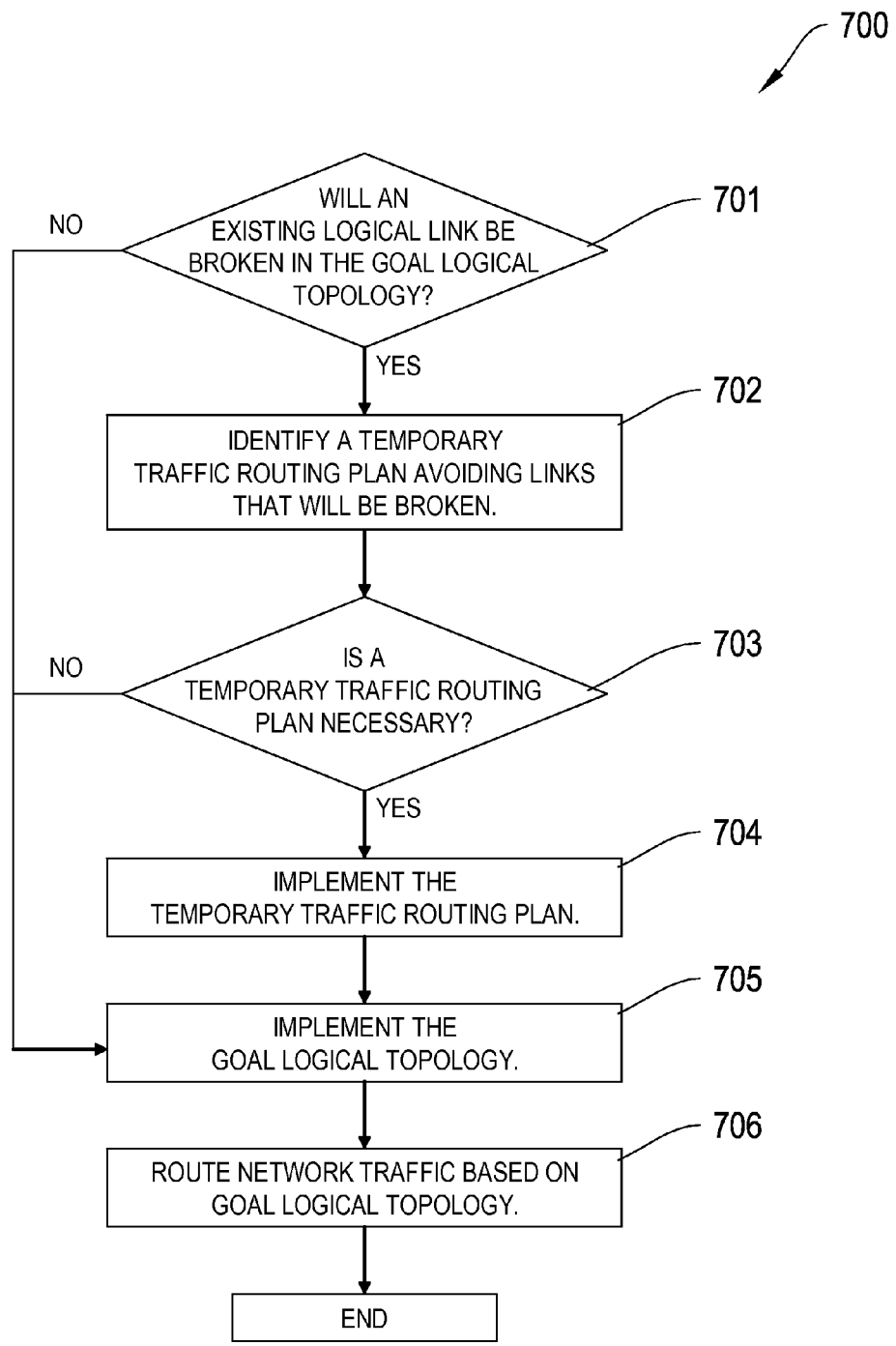
FIG. 7 is a flow chart of a method of implementing a network topology change, according to an illustrative embodiment.

FIG. 7 is a flow chart depicting an illustrative embodiment of implementation method 700, which reduces the network disruptions caused by adopting a goal logical topology such as the provisional logical topology of dynamic change method 500. Step 701 determines whether an existing logical link will be eliminated from the goal logical topology. If an existing logical link will be eliminated, step 702 identifies a temporary traffic routing plan, based on the current logical topology determines but avoiding logical links that will be eliminated from the goal topology. A traffic routing plan may be found using a suitable routing algorithm, such as the Dijkstra algorithm. The Dijkstra algorithm determines a routing plan based on a cost of each route and is described in Thomas, Leiserson, Rivest, and Stein, Introduction to Algorithms, Second Edition, MIT Press and McGraw-Hill, which is incorporated herein in entirety by reference. Step 703 determines whether the temporary traffic routing plan is required to meet a predetermined network performance target, which may include a maximum number of dropped packets. As an illustrative example, if implementing a temporary traffic routing plan will require three seconds to implement but only save a packet in a traffic flow robust with respect to dropped packets, the implementation method 700 may proceed to step 705. If the temporary traffic routing plan is necessary, step 704 implements the temporary traffic routing plan, preventing the network from inadvertently sending traffic to the wrong destination when the goal logical topology is implemented. Regardless of whether a logical link will be eliminated in the logical topology to be adopted or whether a temporary traffic routing plan was required, step 705 implements the goal logical topology without violating the network performance target. Step 706 completes implementation method 700 by identifying and implementing a traffic routing plan that takes advantage of the goal logical topology. The traffic routing plan of step 706 may be found using an algorithm similar to that used in step 702.

Figure 8:
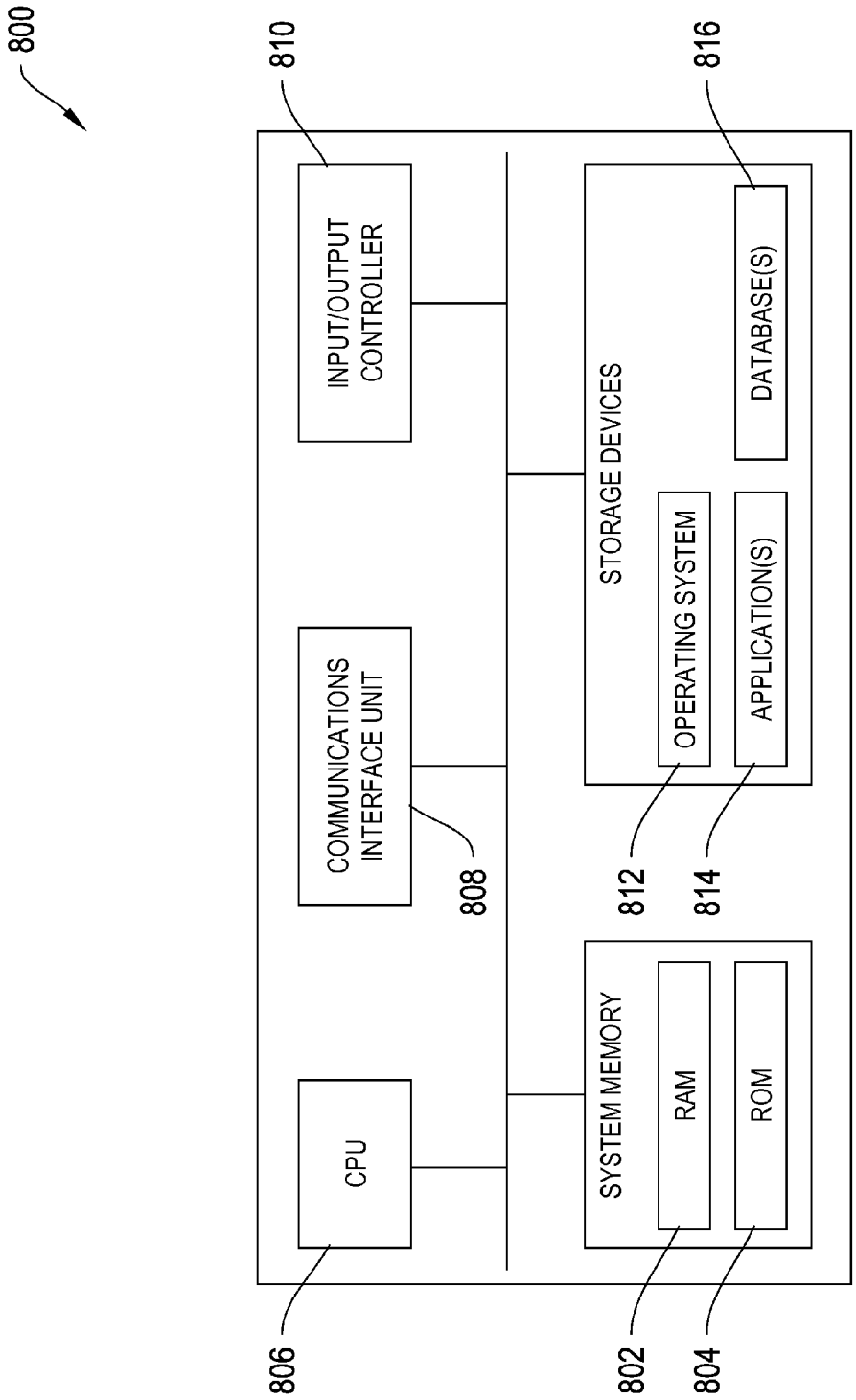
FIG. 8 is a block diagram of a computing device for performing any of the processes described herein.

FIG. 8 is a block diagram of a computing device that can be used to implement or support the any of the components of the system of FIG. 1, and for performing any of the processes described herein. Each of the components of system 100 may be implemented on one or more computing devices 800. In certain aspects, a plurality of the components of system 100 may be included within one computing device 800. In certain implementations, a component and a storage device may be implemented across several computing devices 800.

The computing device 800 comprises at least one communications interface unit, an input/output controller 810, system memory, and one or more data storage devices. This can support a communications port such as traffic port 402a of FIG. 1. The system memory includes at least one random access memory (RAM 802) and at least one read-only memory (ROM 804). The memory 804 can support the configuration database 305, the network state database 307, and the logical topology database 311, for example. All of these elements are in communication with a central processing unit (CPU 806) to facilitate the operation of the computing device 800. The computing device 800 may be configured in many different ways. For example, the computing device 800 may be a conventional standalone computer or alternatively, the functions of computing device 800 may be distributed across multiple computer systems and architectures. In FIG. 8, the computing device 800 is linked, via network or local network, to other servers or systems.

The computing device 800 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 808 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 806 comprises a processor, such as one or more conventional microprocessors and one or more supplementary co-processors such as math co-processors for offloading workload from the CPU 806. The CPU 806 is in communication with the communications interface unit 808 and the input/output controller 810, through which the CPU 806 communicates with other devices such as other servers, user terminals, or devices. The communications interface unit 808 and the input/output controller 810 may include multiple communication channels for simultaneous communication with, for example, other processors, servers or client terminals.

The CPU 806 is also in communication with the data storage device. The data storage device may comprise an appropriate combination of magnetic, optical or semiconductor memory, and may include, for example, RAM 802, ROM 804, flash drive, an optical disc such as a compact disc or a hard disk or drive. The CPU 806 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 806 may be connected to the data storage device via the communications interface unit 808. The CPU 806 may be configured to perform one or more particular processing functions.

The data storage device may store, for example, (i) an operating system 812 for the computing device 800; (ii) one or more applications 814 (e.g., computer program code or a computer program product) adapted to direct the CPU 806 in accordance with the systems and methods described here, and particularly in accordance with the processes described in detail with regard to the CPU 806; or (iii) database(s) 816 adapted to store information that may be utilized to store information required by the program.

The operating system 812 and applications 814 may be stored, for example, in a compressed, an uncompiled and an encrypted format, and may include computer program code. The instructions of the program may be read into a main memory of the processor from a computer-readable medium other than the data storage device, such as from the ROM 804 or from the RAM 802. While execution of sequences of instructions in the program causes the CPU 806 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to changing a logical topology of a computer network as described herein. The program also may include program elements such as an operating system 812, a database management system and "device drivers" that allow the processor to interface with computer peripheral devices (e.g., a video display, a keyboard, a computer mouse, etc.) via the input/output controller 810.

The term "computer-readable medium" as used herein refers to any non-transitory medium that provides or participates in providing instructions to the processor of the computing device 800 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 806 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 800 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. For example, a temporary network traffic routing plan may not be implemented if a logical topology change will drop fewer packets than a predetermined threshold, the computer network may be a wide area network or an enterprise network, or the network may not use the OpenFlow protocol. It should be understood that various alternatives to the embodiments of the disclosure described herein may be employed in practicing the disclosure. It is intended that the following claims define the scope of the disclosure and that methods and structures within the scope of these claims and their equivalents be covered thereby.

We claim:

1. A computer-implemented method to, in response to a network event, reconfigure a network topology of a network having a configurable patch panel and a software-configured packet switch, comprising:
   identifying, by a solver, an alternative logical topology different from a current logical topology;
   identifying, by the solver, a link in the current logical topology not present in the alternative logical topology, and generating a temporary traffic routing plan bypassing the identified link;
   reconfiguring, by a patch panel manager, the configurable patch panel to implement the alternative logical topology; and
   providing, by a network element manager, the temporary traffic routing plan to the software-configured packet switch for implementation prior to the reconfiguring, and an updated traffic routing plan based on the alternative logical topology to the software-configured packet switch for implementation after the reconfiguring.

2. The method of claim 1, wherein the configurable patch panel is an optical circuit switch.

3. The method of claim 1, wherein the network element manager is an OpenFlow controller.

4. The method of claim 1, wherein the network event represents a network administrator request.

5. The method of claim 1, wherein the network event represents a failure to meet a network performance target.

6. The method of claim 1, wherein the network event represents a change in network traffic.

7. The method of claim 1, wherein the network event represents a change in a connection status of a port, link, software-configured packet switch, or configurable patch panel.

8. The method of claim 1, further comprising determining physical topology information by allowing the software-configured packet switch to transmit a discovery packet across at least a portion of the network.

9. The method of claim 1, further comprising determining physical topology information by allowing the configurable patch panel to implement a predetermined logical topology.

10. The method of claim 1, wherein the alternative logical topology is a provisional logical topology intermediate between the current logical topology and a second alternative logical topology, the method further comprising identifying the provisional logical topology based on a network performance target.

11. The method of claim 1, wherein the alternative logical topology is a provisional logical topology intermediate between the current logical topology and a second alternative logical topology, the method further comprising identifying the provisional logical topology based on a duration of the provisional logical topology.

12. The method of claim 1, further comprising identifying the alternative topology based on a network performance target.

13. A non-transitory computer readable medium storing a program for responding to a network event by reconfiguring a network topology of a network having a configurable patch panel and a software-configured packet switch, the process comprising:
   identifying an alternative logical topology based different from a current logical topology;
   identifying a link in the current logical topology not present in the alternative logical topology, and generating a temporary traffic routing plan bypassing the identified link;
   reconfiguring the configurable patch panel to implement the alternative logical topology; and
   providing the temporary traffic routing plan to the software-configured packet switch for implementation prior to the reconfiguring, and an updated traffic routing plan based on the alternative logical topology to the software-configured packet switch for implementation after the reconfiguring.

14. The storage medium of claim 13, wherein the configurable patch panel is an optical circuit switch.

15. The storage medium of claim 13, wherein the program is implemented by an OpenFlow controller.

16. The storage medium of claim 13, wherein the network event represents a network administrator request.

17. The storage medium of claim 13, wherein the network event represents a failure to meet a network performance target.

18. The storage medium of claim 13, wherein the network event represents a change in network traffic.

19. The storage medium of claim 13, wherein the network event represents a change in a connection status of a port, link, software-configured packet switch, or configurable patch panel.

20. The storage medium of claim 13, wherein the program is further configured for determining physical topology information by allowing the software-configured packet switch to transmit a discovery packet across at least a portion of the network.

21. The storage medium of claim 13, wherein the program is further configured for determining physical topology information by allowing the configurable patch panel to implement a predetermined logical topology.

22. The storage medium of claim 13, wherein the alternative logical topology is a provisional logical topology intermediate between the current logical topology and a second alternative logical topology, and the program is further configured for identifying the provisional logical topology based on a network performance target.

23. The storage medium of claim 13, wherein the alternative logical topology is a provisional logical topology intermediate between the current logical topology and a second alternative logical topology, and the program is further configured for identifying the provisional logical topology based on a duration of the provisional logical topology.

24. The storage medium of claim 13, wherein the program is further configured for identifying the alternative topology based on a network performance target.

25. A system to, in response to a network event, reconfigure a computer network having a configurable patch panel and a software-configured packet switch, comprising:
   a patch panel manager configured to program the configurable patch panel to implement a logical topology for the computer network;
   a network element manager configured to program the software-configured packet switch with a traffic routing plan, and for monitoring a status of the software-configured packet switch;
   a wiring verification component configured to determine a connectivity of the configurable patch panel to other elements in the computer network;
   a solver configured to identify, in response to a network event, an alternative logical topology based on the determined connectivity of the configurable patch panel, the status of the software-configured packet switch, and a network performance target, and further configured to generate one or more alterations to the logical topology and a modified traffic routing plan for implementing the alternative logical topology; and a sequencer configured to coordinate the alterations and implement the alternative logical topology, wherein the network element manager provides a temporary traffic routing plan to the software-configured packet switch for implementation prior to a first alteration in the one or more alterations and an updated traffic routing plan to the software-configured packet switch for implementation after the first alteration.

26. The system of claim 25, wherein the configurable patch panel is an optical circuit switch.

27. The system of claim 25, wherein the network element manager is an OpenFlow controller.

28. The system of claim 25, wherein the network event is a network administrator request.

29. The system of claim 25, wherein the network event is a failure to meet a network performance target.

30. The system of claim 25, wherein the network event is a change in network traffic.

31. The system of claim 25, wherein the network event is a change in a connection status of a network element.

32. The system of claim 25, wherein the network event is a change in a connection status of the configurable patch panel.

33. The system of claim 25, wherein the network element manager is configured to generate the temporary traffic routing plan to bypass a link that will not be present after implementation of the first alteration.

34. The system of claim 25, wherein the network element manager is configured to generate the update traffic routing plan based on a logical topology resultant from implementation of the first alteration.

* * * * *